March 24, 1942.  H. L. POPE ET AL  2,277,607
BROACHING TOOL
Filed March 10, 1941  2 Sheets-Sheet 1
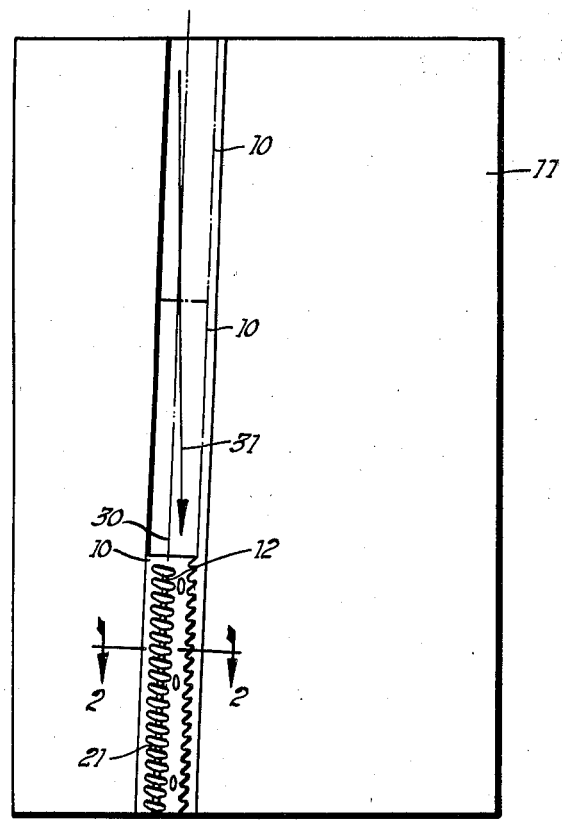
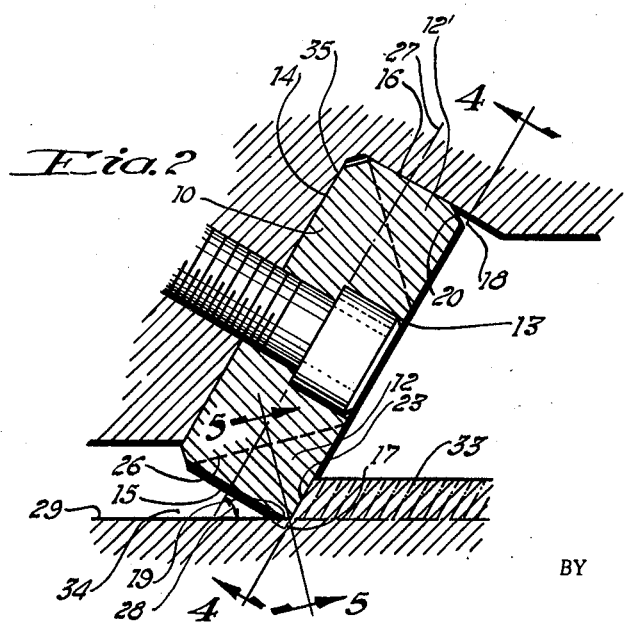
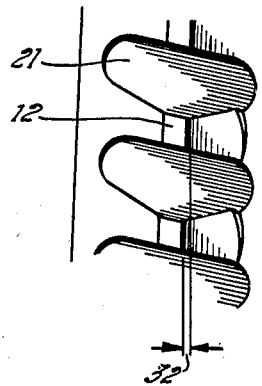
INVENTOR.
HOWARD L. POPE
GEORGE R. SQUIBB
ATTORNEY.

March 24, 1942.　　H. L. POPE ET AL　　2,277,607
BROACHING TOOL
Filed March 10, 1941　　2 Sheets-Sheet 2
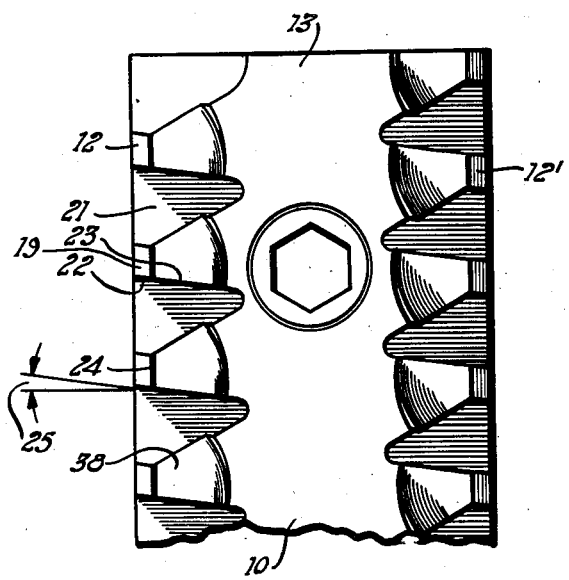
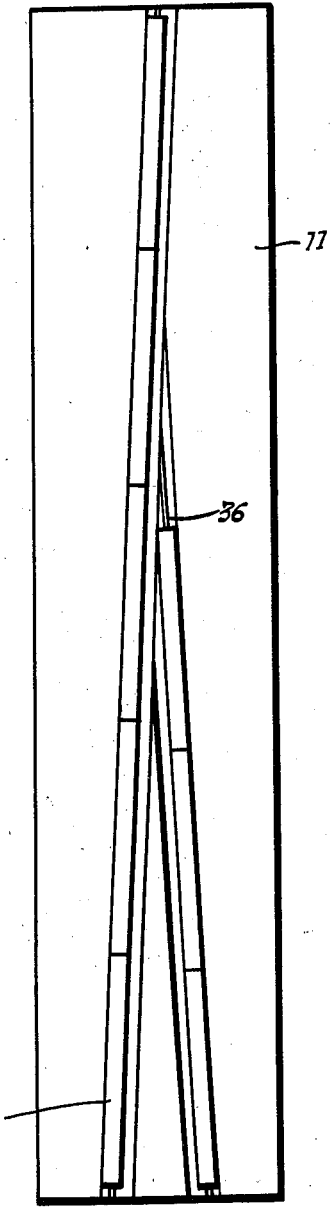
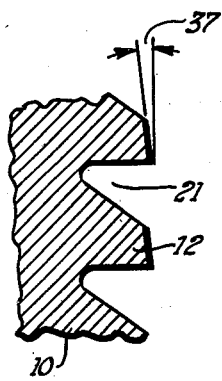
INVENTOR.
HOWARD L. POPE
GEORGE R. SQUIBB
BY
ATTORNEY.

Patented Mar. 24, 1942

2,277,607

UNITED STATES PATENT OFFICE 2,277,607

BROACHING TOOL

Howard L. Pope and George R. Squibb, Cincinnati, Ohio, assignors to The Cincinnati Milling Machine Co., Cincinnati, Ohio, a corporation of Ohio Application March 10, 1941, Serial No. 382,562

12 Claims. (Cl. 29—95.1)

This invention relates to metal cutting tools and more particularly to improvements in broaches.

One of the objects of this invention is to provide improved means for broaching surfaces which is so contrived that each tooth will cut the full depth of the material to be removed in such a manner that a scaly or brittle outer wall on the material will not be as destructive to the cutting teeth as it is with present methods of broaching.

Another object of this invention is to provide an improved broach which will remove excess stock in the form of relatively thick short chips which require less power to separate than long thin chips, thereby improving the efficiency of the machine.

A further object of this invention is to provide a broach having two sets of cutting teeth thereon so that after one set becomes dull the other set may be immediately utilized, thereby increasing the time between sharpening operations and utilizing the costly material of which broaches are made to better advantage.

Another object of this invention is to produce a broaching tool which is unaffected by variations in the thickness of stock to be removed.

A further object of this invention is to provide a broach which has an inherent capacity for discharging chips from between the teeth, thereby eliminating the inconvenience of chip clogging and the use of scrapers or cleaners.

A still further object of this invention is to provide broaching teeth which are amply supported, greatly reducing the possibility of the teeth breaking off as well as serving for the rapid conduction of heat away from the point of cutting.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is a view in elevation of a broach embodying the principles of this invention.

Figure 2 is an enlarged section on the line 2—2 of Figure 1.

Figure 3 is a view in elevation of a tool unit similar to Figure 1 showing some of the broaching teeth greatly enlarged.

Figure 4 is a detail sectional view on the line 4—4 of Figure 2.

Figure 5 is a view of a modified form of the invention.

Figure 6 is a view similar to Figure 1 showing a modified form of the invention.

Referring to Figure 1 of the drawings, the broach of this invention is made up of one or more tool units 10, together with a base plate 11 for supporting the unit or units in a prescribed angular relationship for presentation to the work. Certain advantages are derived from making the broach in several parts in this manner, such as economy in material, because the base plate 11 does not have to be made of the same expensive material that enters into the construction of the cutting units. Further, by providing several cutting units of convenient size they are easier to handle both in manufacture and in subsequent sharpening operations, as well as lending flexibility to the ultimate make-up of the tool dependent on work conditions.

One of the features of this invention is that the tool is designed so that each tooth 12 cuts diagonally across the full depth of the material to be removed as shown in Figure 2 much in the manner of a planing operation whereby the number of teeth and thereby the number of units depends upon the width of the work and the thickness of the chip per tooth. After the proper number of units 10 have been attached to the base plate 11, the entire assembly is secured to the platen of a broaching ram.

Each unit 10 is made from bar stock which is substantially rectangular in cross section as shown in Figure 2 and of a convenient length to handle both for assembly purposes and for sharpening. The unit, being of rectangular cross section, has necessarily two wide side faces 13 and 14 and two narrow end faces 15 and 16 extending longitudinally of the bar.

The longitudinal dihedral angles 17 and 18 formed by the intersection of a side face such as 13 with the two adjacent end faces 15 and 16 are cut away to form corner faces 19 and 20. The broaching teeth 12 are formed by cutting a series of notches or serrations 21 of substantially sawtooth cross sectional shape as shown in Figure 5 in the corner face 19, the notches extending transversely thereof whereby they intersect the side face 13 and end face 15.

Attention is invited to the fact that the cutting teeth 12 are formed in one corner face of the tool, but since it is more economical to form cutting edges in both corner faces of the tool, a second set of cutting teeth 12' are formed in the other corner face 20 making two sets of teeth which may be successively used before it is necessary to remove the unit from the machine for sharpening purposes.

Each tooth 12 has a first cutting edge 22, Figure 4, extending the width of the corner face 19, and a second cutting edge 23 extending for some distance along the side face 13 depending upon the depth of notches 21. In other words, there is produced a series of obtuse-angled cutting edges, one leg 22 of the angle lying in the plane of the corner face 19 and the other leg 23 lying in the plane of the side face 13. Thus, there is one series of cutting edges which lies in a first plane such as the plane of the corner face and a second series of edges which lies in a second plane or the plane of the side face and these two planes intersect in a line of intersection 24 which contains the apexes of the obtuse-angled cutting edges. The notches 21 are not cut perpendicular to this line of intersection 24 but rather at a small angle thereto as indicated by the reference numeral 25 in Figure 4 whereby the cutting edges are non-perpendicular to the line of intersection.

It will be noted that the provision of obtuse-angled teeth makes possible a large base 26 at the connection between the tooth and the main body of the tool which greatly decreases the possibility of the tooth being broken off, as well as providing a large capacity for conduction of heat away from the cutting edges of the tool. This results in very solid and efficient cutting teeth.

The cutting unit 10 is supported by the base plate 11 in such angular relation with respect to the surface to be produced on the work that the series of cutting edges 23 formed on the side face 13 cut diagonally across the full depth of the material to be removed while the cutting edges 22 on the corner face 19 are coincident with the plane of the said surface. This means that the long axis 27 of the rectangle constituting the cross sectional shape of the bar makes an acute angle 28 with the work surface 29 with the chip material included within this angle. In addition, the cutting unit is supported with its longitudinal axis 30 diagonal with respect to the longitudinal axis of movement 31 of the broaching ram, thereby placing the series of teeth 23 in the side face in overlapping relationship, the amount of overlapping as indicated at 32 in Figure 3 being dependent upon the angle of inclination of the diagonal 30 with respect to the axis of movement 31 and determining the thickness of the chip 33 to be removed per tooth. It also determines the number of teeth it is necessary to utilize to cut the full width of the work and thereby the number of cutting units. This also results in the cutting edges 22 in the corner face 19 overlapping but they overlap longitudinally rather than laterally since they are always coincident with the plane of the surface 29 to be produced on the work. This results in the chips 33 having an oblique rectangular cross section.

Attention is invited to the fact that the notches 21 extend crosswise of the final surface and parallel thereto whereby the chips as they are separated may be forced through these notches and discharged at the open end 34 thereof in a free manner, preventing the possibility of the teeth becoming packed with chip material such as happens in conventional broaches when the chip material flows into the notches in a direction more or less perpendicular to the back wall of the notches.

The tool thus inherently provides for the free discharge of the chip material, eliminating the necessity for providing any artificial means for disposing of chips.

It should now be apparent that new and improved results may be obtained by this invention in that the cutting teeth are sturdier, greatly reducing the possibility of breakage. The method of cutting is such that each tooth only has to attack a very small portion of the outer wall which if even of hard scale or brittle can have little effect on any one tooth; that the chips are relatively short and thick requiring less power to separate; and that small variations in the thickness of the removable stock has no appreciable effect on the tools.

The holder is provided with a V-slot 35 for receiving and supporting the tool, the slot determining the angles of the tool both in a horizontal and vertical plane.

The second set of cutting teeth may be formed on the tool units in various ways. They may be cut with the saw-tooth notches cut oppositely from the first set whereby the tool is simply turned end for end and replaced in the same position, or they may be cut facing the same way whereby the tool is turned about its longitudinal axis and placed in a second notch 36 on the other side as shown in Figure 6. The arrangement shown in this figure, provides two sets of teeth, on units arranged at converging angles whereby both sets cut at the same time but from opposite sides of the work piece and toward the center, one set being made longer than the other for cleaning up the center portion of stock.

The corner and side faces are relieved a few degrees to provide the necessary clearance to prevent scoring of the faces by the work. The clearance angle is indicated at 37 in Figure 5 for the corner face, the side face is relieved the same angle which produces the fan-shaped surface 38 indicated in Figure 4. This clearance angle is made sufficient to allow for the angle of tilt of the unit when in working position so that regardless of what the angle of tilt is there will still be sufficient clearance.

The first method could also be used in this case, each tool replacing itself after being turned end for end. When that is done, the tools are made to opposite hand. One of the advantages of using two sets of tools is that the opposing lateral thrusts are balanced, relieving the side thrust on the broach ram.

There has thus been provided an improved and efficient broach which is simple to manufacture and maintain, which is not readily subject to breakage, and which is efficient in operation.

What is claimed is:

1. A broach having a series of cutting edges lying in a given plane, and a second series of cutting edges lying in a second plane, each edge of the first series meeting an edge of the second series in the line of intersection of said planes and all of said edges being non-perpendicular to the line of intersection of said planes.

2. A broach having longitudinally extending front and side faces, a first series of cutting edges formed in the front face, and a second series of cutting edges formed in the side face, each cutting edge in the front face intersecting a respective cutting edge in the side face at an obtuse angle, said front face being adapted to move in the plane to be produced on the work.

3. A broach having a first set of cutting edges lying in a plane which is adapted to be coincident with the surface to be produced, and a second set of cutting edges lying in a plane angularly related to the first plane, said second set of cutting edges overlapping in a direction parallel to the first plane.

4. A broach having a series of cutting edges lying in a given plane adapted to be coincident with the plane of the surface to be produced on the work, said edges being angularly related to the axis of movement of the broach, and a second series of cutting edges lying in a plane at an obtuse angle, the line of intersection of said planes being diagonally related to the axis of movement of the broach whereby the cutting edges of the second series will overlap in a direction crosswise of the surface to be produced.

5. A broaching tool having a series of obtuse-angled edges, the cutting edge portions constituting one leg of the angle lying in a plane adapted to be coincident with the surface to be produced, the edge portions constituting the other leg of the angle overlapping in a direction crosswise of the surface to be produced whereby the second set of edges cuts diagonally across the full thickness of the material to be removed.

6. A broach comprising an elongated body member of substantially rectangular cross section, said member having one longitudinal corner flattened to form a corner face intersecting a side face at an obtuse angle, and transversely extending notches cut in the corner face and intersecting the side face to form cutting teeth having obtuse angled cutting edges.

7. A broach comprising an elongated body member of substantially rectangular cross section, said member having one longitudinally corner flattened to form a corner face intersecting a side face at an obtuse angle, transversely extending notches cut in the corner face and intersecting the side face to form cutting teeth having obtuse angled cutting edges, and means to support the member in such position that the corner face cutting edges lie in a plane coincident with the plane of the surface to be formed on the work.

8. A broach comprising an elongated body member of substantially rectangular cross section, said member having a corner face extending longitudinally thereof and intersecting the side face at an obtuse angle, transversely extending serrations cut in the corner face and intersecting the side face to form teeth having obtuse-angled cutting edges, and means to support the member in such position that the apexes of the angular cutting edges lie in a line which is diagonal to the direction of relative movement between the broach and the work and which lies in the plane of the surface to be produced on the work.

9. A broach comprising a body member of substatnially rectangular cross section and having a longitudinally extending corner face which intersects a side face at an obtuse angle, said corner face having a series of equally spaced serrations therein intersecting the side face to form cutting teeth, and means to support the member in such relation that the long axis of the rectangle intersects the surface to be formed in an acute angle.

10. A broach comprising a body member of substantially rectangular cross section and having a longitudinally extending corner face, said corner face having a series of equally spaced serrations formed therein and intersecting the side face in an oblique angle to form cutting teeth having oblique angled cutting edges, and means to support the member with the long axis of the rectangle in acute angular relationship to the surface to be formed and with the longitudinal axis of the member inclined to the axis of relative movement between the tool and work.

11. A broach comprising a series of units, each unit comprising an elongated member having equally spaced cutting teeth longitudinally thereof, each tooth having an obtuse-angled cutting edge, said units being supported with one leg of each cutting edge lying in a plane coincident with the surface to be formed and with the other cutting edges successively overlapping for removal of chips progressively crosswise of the surface to be formed whereby the number of units to be utilized depends upon the width of the surface to be broached.

12. In a broach, a plurality of cutting teeth equally spaced longitudinally of the broach, each tooth having an obtuse angled cutting edge, the plane of said teeth being inclined to the longitudinal axis of the broach, and means to support the broach with its longitudinal axis inclined to the direction of relative movement between the broach and the work to effect lateral overlapping of one leg and longitudinal overlapping of the other leg of the angular cutting edges whereby the material will be removed in chips of obtuse-angled rectangular cross section in progression laterally of the final surface.

HOWARD L. POPE.
GEORGE R. SQUIBB.